United States Patent [19]

Bartolini

[11] 3,995,799
[45] Dec. 7, 1976

[54] HANG GLIDER

[76] Inventor: Frank J. Bartolini, 4 Patton Court, Wayne, N.J. 07470

[22] Filed: May 23, 1975

[21] Appl. No.: 580,440

[52] U.S. Cl. .................................. 244/16; D12/71; 244/DIG. 1
[51] Int. Cl.² ........................................ B64C 31/02
[58] Field of Search ......... 244/16, 45 R, 64, 138 R, 244/153 R, 154, DIG. 1; 46/79, 80; 272/24; D12/71

[56] References Cited
UNITED STATES PATENTS 3,295,793   1/1967   Renart ........................... 244/153 R

*Primary Examiner*—Trygve M. Blix
*Assistant Examiner*—Barry L. Kelmachter
*Attorney, Agent, or Firm*—James J. Cannon, Jr.; James J. Cannon

[57] ABSTRACT

A biwinged high performance collapsible hang glider having a simplified integrated frame, having a reinforcing cable system, having a variable camber upper swept wing including a sail, with non-rigid leading and trailing edges, and a flexible batten, having a bridge spacing the sail from the frame, having a lower undercambered sail wing including a sail with a tubular leading edge and nonrigid trailing edge, having an optional collapsible Y-tail modification including sail with non-rigid leading edge and hinged tubular-trailing edges, having a low wing-loading effect, a high lift-drag ratio, a high glide-ratio, a low sink-rate and minimal spiral instability, yielding the capability of effective body-english pilot control for short duration training flights or for long duration cross-country flights, and being collapsible so as to be readily transported by a common passenger vehicle.

11 Claims, 16 Drawing Figures

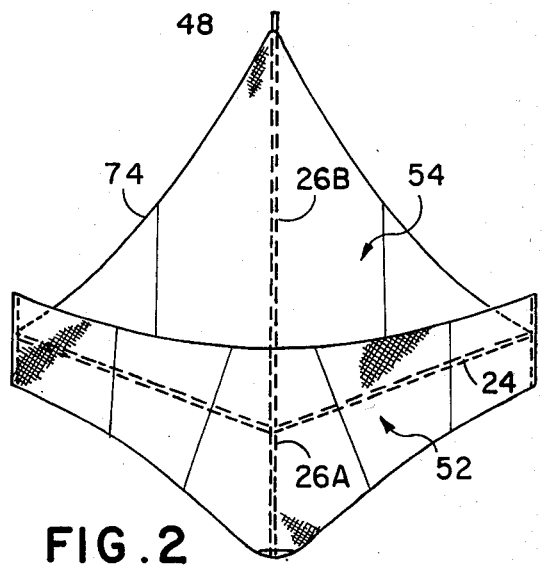
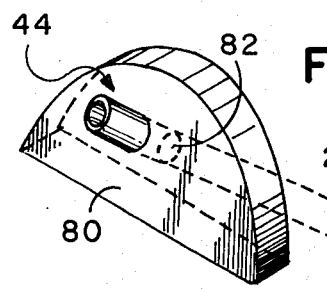
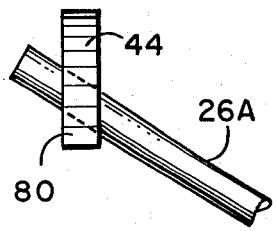
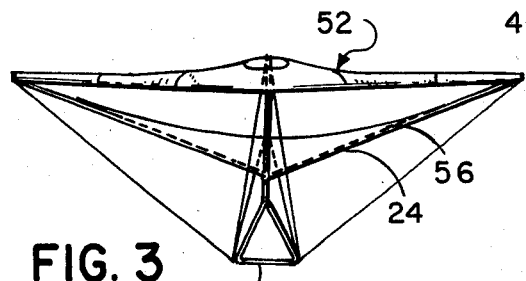
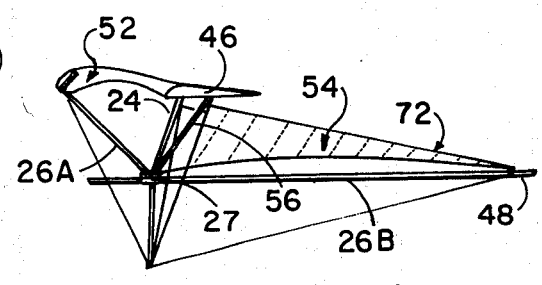
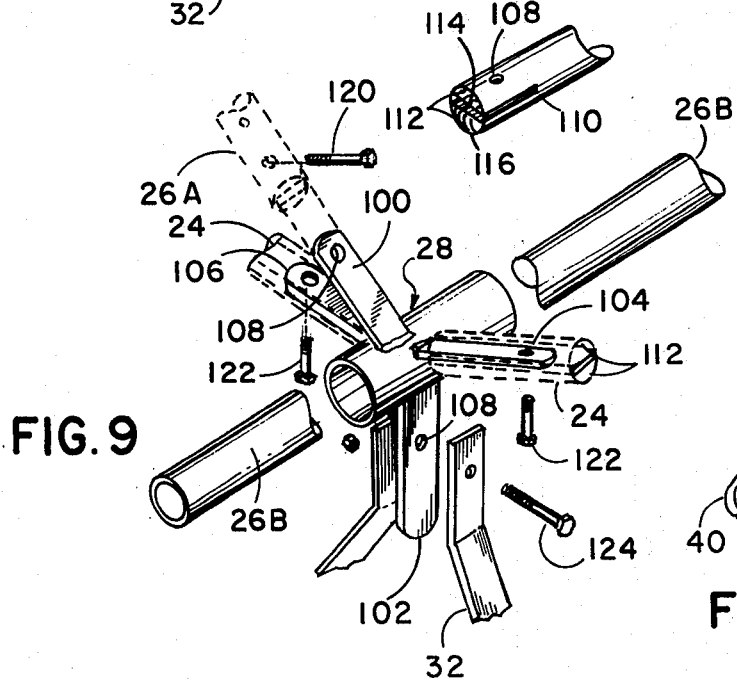
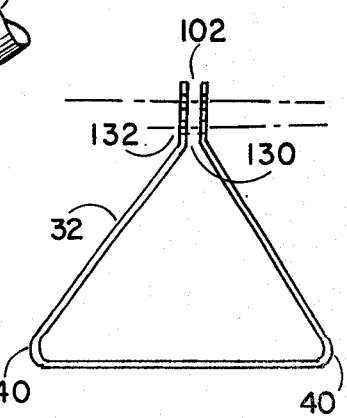

HANG GLIDER

BACKGROUND OF THE INVENTION

1. Field of the Invention

This invention pertains to a novel design for a collapsible hang glider, which is a glider type of aircraft having limited operator control, in which the point of novelty lies in the structure and arrangement of the airfoils and the capability to collapse the entire hang glider including folding the airfoils to a relatively small size for ease of transport.

2. Description of the Prior Art

Self-launched hang gliding began with the earliest pioneers of aviation during the late 1800's. Recently this method of aviation has undergone a rebirth of popularity. It has become a relatively low cost recreational activity spurred on by man's age old fascination with flight. Hang gliders may be flown anywhere that suitably sloped terrain faces prevailing winds.

Hang gliders in flight are governed by the same principles which affect all other flying machines. Lift and drag are prime considerations with respect to performance. Wing span, wing loading, and air speed are also important factors to be considered in the performance of the aircraft especially when maneuvering or turning the aircraft. Most hang gliders are launched by a running jump off a hill. The pilot controls the flight with body english. Most commercially available models provide a downhill ride of a few seconds or perhaps a brief soar along a ridge when the wind is right.

The Rogallo-type glider, the best known of hang glider models, is the ancestor of recent models. The main features of the Rogallo are a flexible delta wing, ease of assembly and disassembly and transport. When deployed, the shape of the glider is maintained in the shape of an inverted "V" by a tubular aluminum frame reinforced by a system of tension lines. Most commercially available models of the Rogallo-type have a sail area of approximately 208 square feet, a wing span of 24 feet, a glide ratio of 4:1 a stall speed of 14 MPH and a sink rate of 450 feet per minute. The Rogallo is relatively safe for a beginner to operate when properly instructed.

The leading edge of the sail is secured around a tubular frame to create the airfoil. The trailing edge should not be taut, but be able to reflex slightly; nor should this edge have tape sewn to it to make the edge semi-rigid. Making the sail more taut, which would tend to increase the glide ratio, decreases the craft's stability. Battens, which do make a sail more taut, are recommended only to correct a poorly contoured sail or to increase stability if high speed flight (35 MPH) is anticipated. Usually battens only add excess weight which in turn reduces overall performance of the Rogallo models.

More recent designs of hang gliders have attempted to achieve a craft with higher performance characteristics. With these high performance craft, hang glider pilots are looking toward flying under marginal conditions, toward achieving greater soaring feats and toward attempting longer cross-country flights. Therefore, a craft with greater lift capability, flatter glide angle, lower sink rate, and more complete control than earlier craft are being developed.

A glider developed upon the principles of the Rogallo is the Eagle III, with its predecessor being the Eagle II. The Eagles were developed to create a high performance craft which would allow continuous gliding on windward slopes with greater control and maneuverability. These models are considered to be easier to control in 180° turns on windward slopes than the Rogallo models. Safety is another consideration of these models and was accomplished by designing a tubular leading edge of larger diameter than the Rogallo. This helps to create a deeper camber which in turn increases the lift and glide ratios. The result is a gentler stall and a descent which resembles that of a parachute-like descent.

The Eagle II is characterized by a non-swept sail wing. It has a sail area of only 150 square feet. The machine is comparatively heavy, weighing 75 pounds; thus, a critical aspect, that of wing loading, is a high coefficient, much greater than one. A loading coefficient of about one is optimum. High wing loading increases speed and sink rate but makes controlability easier, while low loading yields the opposite effects. The high wing loading is countered by the deep camber of the sail wing which improves lift, performance and stability. The lift coefficient of the Eagle II is about equal to two. These performance characteristics are similar to those of a large Rogallo model that is used to train beginners. This Rogallo model, however, because of its size, is not flown in winds much greater than 10 MPH as it is very hard to control and maneuver. When stalled, the Eagle-type glider tends to settle downward rapidly and nose down slowly, rather than abruptly go into a nose dive as the Rogallo-types are known to do.

The Eagle III is a high performance, monoplane type configuration with a variable camber wing. A tail is incorporated into the structure to give improved stability. The lift characteristics are similar to Eagle II but its weight is only 50 pounds. The Eagle III has a sail area of only 150 square feet but has an improved ratio of 10:1. The long wing creates slower and more sustained soaring flight but also creates problems when maneuvering. The longer the wing, the slower the wing tip moves during a turn which may result in spiral instability. The pilot is not able to easily control the craft by simply repositioning his body. Also the stall speed is relatively high, being 17 MPH, because of the small wing area; thus, this hang glider, because of its control problems, is recommended only for experienced pilots.

The monoplane and biplane configuration high performance hang gliders have a rigid construction making them difficult to transport. They have a large wing span and are prone to the same manueverability problems encountered by Eagle II and Eagle III. Rather than the pilot controlling the craft by shifting his weight, mechanical control mechanisms are necessary to maintain the craft's attitude. The major problem involves making the control system readily available to the pilot. Even when an efficient mechanical control system is devised, the amount of control is less than the full three-axis control of a Rogallo or Eagle-type glider.

Examples of these hang gliders are the Icarus V, XJ-24, and Swingwing. These have been developed, as has been the Eagle III, for high performance, sustained soaring flight. The glide ratio approaches 10:1. The weight of these craft ranges from 50 to 100 pounds. The stall speeds range from 16 to 19 MPH. These models are definitely not recommended for beginners.

The hang glider disclosed herein was designed to combine the advantageous characteristics of the previous hang glider models, which include: high performance, simple construction from lightweight materials, ease of assembly and disassembly, safety, easy portability and relatively low expense. The design maximizes lift, decreases drag, and improves stability.

The swept upper wing has a nonrigid leading edge which is not formed by aluminum tubing as in prior art hang-gliders. The leading edge is simply made of fabric reinforced with nylon fabric tape. Stranded cable is secured within the seamed edge to maintain structural integrity. The airfoil shape of the wing is achieved by a combination of, the binding in the fabric along the leading edge, the formed wing tips, the long batten positioned longitudinally along the center of the wing and the bridge member positioned between the sail and the forward keel member. The nonrigid structure of the wing produces a variable camber which in turn maximizes lift when flying at slow speeds.

A glide ratio of 9:1 is achieved even though the wing span is only 22 feet. This is accomplished due to the positioning of a novel lower undercambered sail wing below and rearward to the upper wing. The lower wing forms a large dihedral angle, which, in turn, forms a very efficient airfoil yielding added lift and stability. Due to the large sail area, the wing loading is approximately one-third less than that of the Rogallo types which enables slower flying speeds and a slower, softer rate of decent. The incorporation of the sail wing also creates greater maneuverability. Since the lower sail wing allows for a shorter wing span, spiral instability is reduced greatly.

A minimum of support structure is used. The frame simply consists of a two-member sectioned keel and two transverse frame members. The forward keel member and transverse frame members converge and attach to a collar which surrounds the leading apex of the after keel member. The frame is so assembled that it may be easily collapsed. A standard size passenger type motor vehicle may be used to transport the collapsed hang glider.

The craft is extremely safe for beginners as it is easily controlled by body english. It naturally tends to return to level flight when put in a banking position rather than nose down and dive as the Rogallo types have a tendency to do. When stalled, the craft will act as a parachute. Descent may be made slowly and safely.

A Y-tail may be incorporated into the design to further increase stability. No additional mechanical controls are needed to operate this modification. The tail adaptation would be incorporated for high speed flying up to 40 MPH. It would also be used in erractic wind conditions and in cross-country flight by experienced pilots.

SUMMARY OF THE INVENTION

This invention relates to a collapsible, foldable, biwinged high performance hang glider, representing a new concept in relation to previous hang-glider designs. The entire structure may be easily assembled, disassembled, folded and transported. The materials are lightweight and consist of a minimum of aluminum tubing, stranded cable, and sail fabric. This invention involves a novel means of attaining a improved lift-drag ratio and glide ratio at slow speeds because of the design and positioning of the wings. This in turn allows improved maneuverability and safety during soaring flight than prior art glider designs. A beginner or inexperienced person may use this invention with confidence and with a minimum of instruction.

The hang glider is characterized by a minimum of support structure. The support structure is made preferrably from aluminum tubing. A sectional keel comprised of two distinct members lies longitudinally with respect to the craft. When viewed from the side, the keel members form an angle of 140°, which may vary with respect to craft modifications. The after keel is surrounded at its leading apex by a tubular collar. The forward keel member leading to the leading apex of the upper wing, attaches to the upper portion of the collar. The hang glider is unique in that the sail fabric is not attached along the entire keel member as is done in most prior art hang gliders. In fact, the keel members attach only to the leading apex of the upper wing and the leading and trailing apexes of the lower wing. The remaining support structure consists of only two aluminum tubes attached to and extending from the sides of the collar to the formed wing tips of the upper wing. These transverse structural members also function as the leading edge of the lower undercambered sail wing. The inherent shape of the lower wing is defined by the positioning of these transverse frame members. The entire support structure is reinforced by a system of stranded cables.

The swept upper wing is novel in several respects. The wing especially is characterized by a unique, nonrigid leading edge comprising soley of sail fabric and binding material, preferrably nylon fabric tape, and stranded cable. The trailing edge is constructed in the same manner. The cable acts to reinforce the edge and is secured by a sewn seam. A bridge is incorporated between the sail fabric and the forward keel member at the leading apex of the wing. This bridge functions to create the beginning of the airfoil effect. A flexible batten, which runs longitudinally along the center of the wing, creates a variable camber. At high flying speeds the batten stabilizes any flapping tendency the sail might have. At slow flying speeds the variable camber allows for maximum lift. The formed wing tips form a type of rib giving the outer edges of the wing an aerodynamic shape, thus providing added lift and stability. Thus the bridging member, the non-rigid leading edge, the formed wing tips, and the flexible batten combine to form a novel airfoil effect with improved flight characteristics.

The novel and unusual design of the lower undercambered sail wing is defined by the transverse support structure of the upper wing. The leading edge of the lower wing is formed by securing the sail fabric around the tubing by means of a sewn seam. The trailing edge is constructed in the same manner as the leading edge of the upper wing. The stranded cable reinforcing the trailing edge helps to maintain the airfoil shape of the lower wing. The sail lies directly above the after keel member but is secured to the keel only at the leading and trailing apexes of the seal.

The two lower sail wings form a small dihedral angle of 20° and are unlike any other wing design used in prior art hand gliders. During flight this angle allows more stability in roll. This shape creates high lift characteristics and unusually high stability. It permits maneuverability with greater safety than is common to most hang gliders. Because of this sail, when banking, the hang glider tends to return to level flight rather than nose down or dive as most commercially available hang gliders do. Since this sail wing acts as a stabilizer, the necessity of a stabilizing tail configuration is eliminated.

The interrelation of the two wings allow the hang glider a large wing surface area (280 square feet), while at the same time, permitting a relatively short wing span. This feature, therefore, maximizes lift potential; but most important, the configuration of the craft, because of the short wing span and low weight (38 pounds) allows allows safety and manueverability not known to prior art hang gliders of comparable airfoil area and lift capability. Thus, the craft is not easily prone to spiral instability. The high lift capability creates a low sink rate and a high glide ratio. The glide ratio approximates 9:1. The craft may maintain stable flight at a speed as low as approximately 10MPH. When the craft does stall, the novel configuration and flight characteristics of the craft allow it to act as a parachute for a slow, soft, and safe descent even for a beginner.

The control bar harness means are attached to the bottom of the collar which surrounds the rear keel member. Stranded cables attached to the control bar run to and attach to the leading and trailing apexes of the craft and to the wing tips. This system forms an adequate and reliable means for controlling and maneuvering the craft by the pilot simply repositioning his body in the direction he wishes to go. This control is unknown to prior art hang gliders of a comparable airfoil area, again because of the invention's short wing span in comparison to its total airfoil area.

A simple modification may be made to add a Y-tail which creates even greater stability and maneuverability for high speed flight (approximately 40 MPH), for flight in erratic wind conditions, or for long duration cross-country flights. The Y-tail configuration is attached to the rear keel member. For the modification, a smaller lower wing sail is used, having a shorter longitudinal length than in the preferred embodiment. The tail has three sails made of fabric. The leading edge is constructed in the same manner as the leading edge of the upper wing. A reinforcing stranded cable system is attached to a collar positioned on the keel at the rear apex of the lower wing. The trailing edge of the tail is formed by fabric securely sewn around aluminum tubing. The aluminum tubing is of a smaller diameter than the tubing used in the rest of the craft. The tubing is hinged to a tubular collar which surrounds the keel at the rear apex of the keel. In flight the tail maintains the shape of a Y.

The hang glider including optional tail may be collapsed in a matter of minutes. A turnbuckle, placed on the stranded cable beneath the leading apex of the upper wing, is loosened to begin the disassembly. A pin is removed from the connection of the forward keel member and collar. The control bar is then folded underneath the structure. The support structure and wings are simply folded and positioned parallel to the rear keel member. The tail modification, also being hinged, simply folds into a similar parallel position to the rear keel after pulling out said pin and loosening the stranded cable.

Simplicity, high performance, and effectiveness of pilot control without mechanical means characterize this invention. Thus, this invention, by reason of its novel configuration, combines the economic, assembly and portability characteristics of the Rogallo-type hang gliders with the high performance characteristics of the recent monoplane type configurations without sacrificing three-axis control or safety. The craft may be flown on flights of long or short duration, even under marginal conditions. It may be used for training the inexperienced flyer and also may be used by the experienced flyer on cross-country flights. The craft is safe in that, because of its relatively short wing span, it is not prone to spiral instability. The craft's natural tendency to right itself during flight minimizes the effect of pilot error. The slow stall speed will allow the pilot to virtually float to the ground.

BRIEF DESCRIPTION OF THE DRAWINGS

FIG. 2 is a top view of the preferred embodiment of FIG. 1.

FIG. 3 is a front view of the preferred embodiment of FIG. 1.

FIG. 4 is a side view of the preferred embodiment of FIG. 1.

FIG. 6 is a perspective view of the connection between the forward keel support member and bridge support located at the leading apex of the upper wing of FIGS. 1 and 5.

FIG. 7 is a side view of the bridge and keel connection of FIG. 6.

FIG. 9 is an enlarged view showing the inter-connection of the keel, supporting frame members, and control bar of FIGS. 1 and 5.

FIG. 11 is a front view of the control bar of FIGS. 1, 5, and 9.

DESCRIPTION OF THE PREFERRED EMBODIMENT

Figure 1:
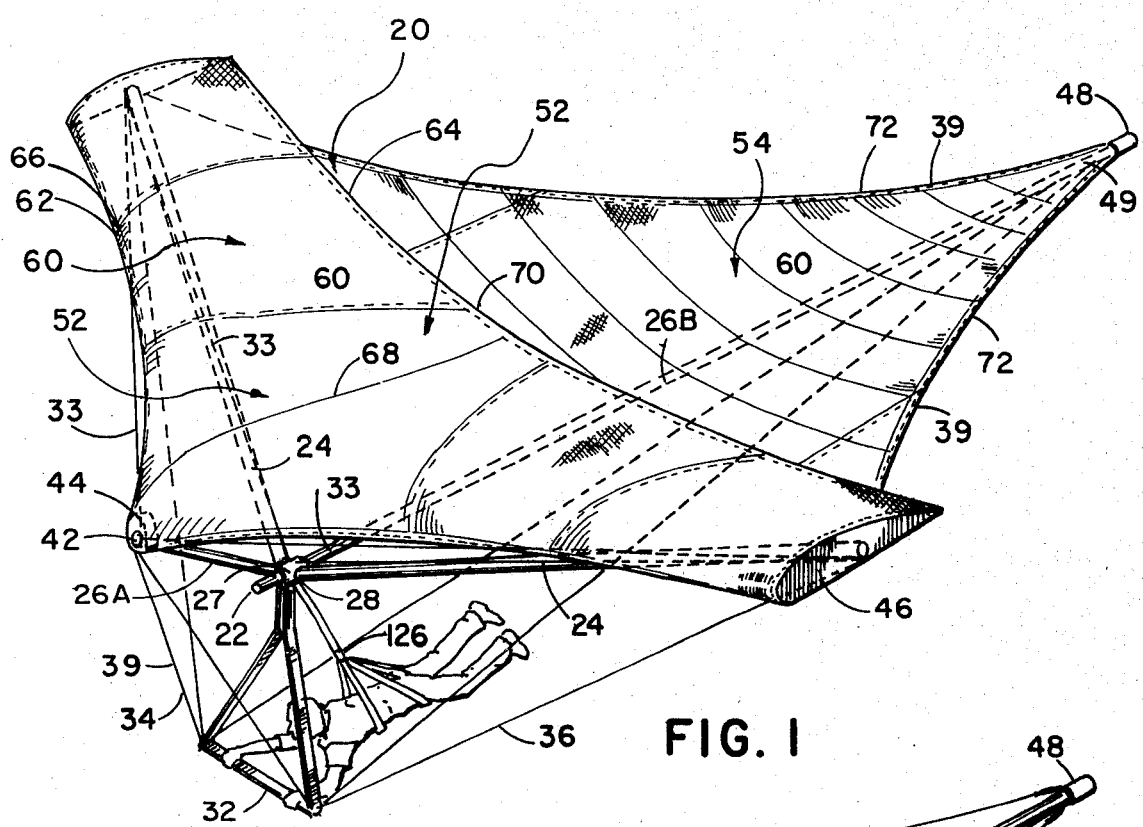
FIG. 1 is a side perspective view illustrating the preferred embodiment of the hang glider of this invention.

Referring to FIG. 1, the preferred embodiment of hang glider 20 of this invention is shown in a typical piloted flight position. Reference is made to FIGS. 2, 3 and 4 which portray the same embodiment as FIG. 1 by the use of different perspectives, but in less detail, to clarify the major components of the invention.

Figure 5:
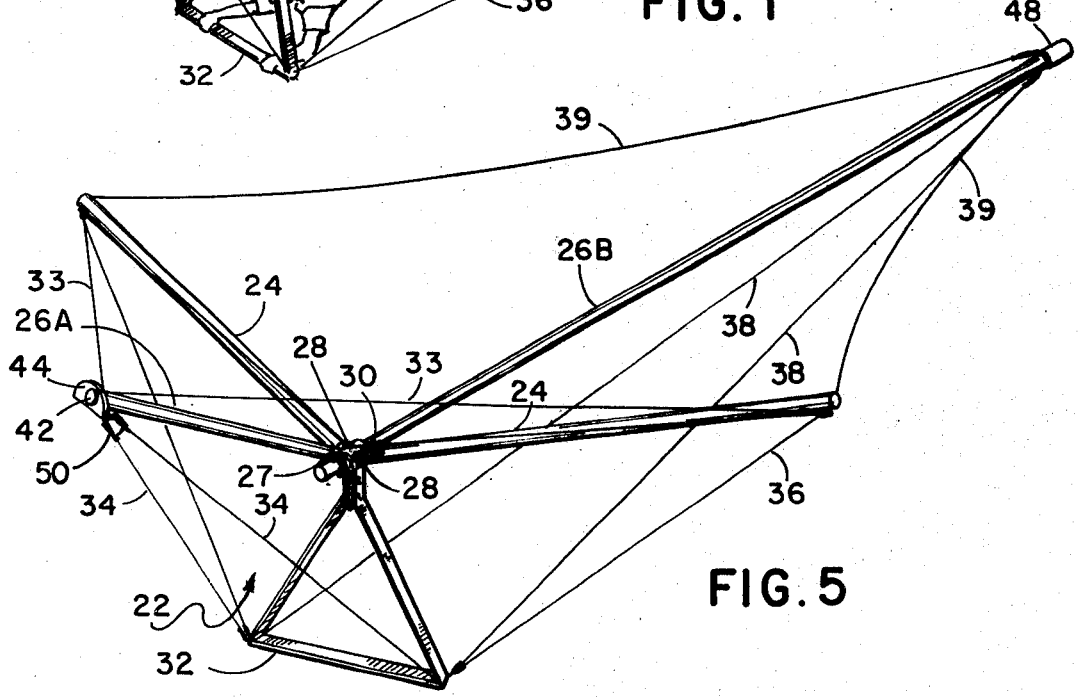
FIG. 5 is a view illustrating the supporting frame structure and reinforcing cable of the hang glider of FIG. 1.

The frame 22 of hang glider 20 is illustrated in FIG. 5. Frame 22 is made preferrably from aluminum tubing and consists primarily of four distinct members: a forward longitudinal keel member 26a, a longer after longitudinal keel member 26b, and two transverse frame members 24. All frame members converge at leading apex 27 of after keel member 26b which is surrounded by tubular collar 28. Collar 28 has brackets 30 incorporated around its perimeter, said brackets 30 forming a means to hinge the remaining frame members, as will be described and illustrated with reference to FIGS. 10 and 11. Forward keel member 26a, positioned on the top of collar 28, forms an angle of 140° with the after keel member 26b. Two transverse members 24, hinged respectively to each side of collar 28, also form an angle of 140°. The previous angles, however, need not be strictly adhered to. Triangularly-shaped control bar 32 is hinged to the underside of collar 28. Reinforcing stranded cable 33 is secured to outer apex of transverse frame member 24 and leading to apex 42 of forward keel member 26a. Reinforcing stranded cables 34, 36, 38 are attached to bottom corners 40 of control bar 32. Cable 34 leads and attaches to leading apex 42 of forward keel member 26a which is joined to bridge 44. Cable 36 is attached to outer apex of transverse frame members 24 which is joined to form wing tips 46. Cable 38 leads and attaches to trailing apex 48 of after keel 26b. Turnbuckle 50 is incorporated into cable 34 at apex 42 to adjust the tension on cable 34 and to afford easy disassembly of hang glider 20. It should be noted that the cable system described is identical on either side of hang glider 20 defined by a plane formed by keel members 26a, 26b. Cable 39 is secured to outer apex of transverse frame members 24 and after apex 48 of after keel 26b.

The preferred embodiment of the invention shown in FIGS. 1–4 primarily consists of frame 22, control bar 32 and cables 33, 34, 36, 38, 39 previously described, and upper swept wing 52 and lower undercambered sail wing 54. Upper wing 52 is supported at its forward apex, by apex 42 of forward keel member 26a. Upper wing 52 is also supported by transverse frame members 24 which are hinged to formed wing tips 46. Transverse frame members 24 from tubular leading edge 56 of lower undercambered sail wing 54, as illustrated in FIGS. 3 and 4. Lower wing 54 is secured to after keel member 26b at forward and after apexes 27, 48 of said after keel member 26b.

Upper swept wing 52, with sail 60 made of fabric, has leading edge 62 and trailing edge 64 which are non-rigid. Edges 62, 64 are made by binding the fabric with nylon tape. Reinforcing stranded cable is secured within edges 62, 64 by means of sewn seam 66. Flexible batten 68, securely sewn in sail 60, runs longitudinally along the center of upper wing 52 from forward apex 42 to mid-point 70 of trailing edge 64. At forward apex 42 of wing 52, bridge 44, fitted on forward keel 26a, spaces sail fabric 60 and said keel member 26a. Aerodynamically shaped formed wing tips 46 form the outer edges of upper wing 52. Wing tips 46 may be made of styrofoam and shaped aluminum. Sail fabric 60 is secured to and covers wing tips 46.

Referring to FIGS. 6 and 7 the attachment of forward keel member 26a and bridge 44 are illustrated. Bridge 44 is of a semicircular shape with flat bottom edge 80 positioned parallel to a horizontal surface. Forward keel member 26a is positioned through pre-cut angeled bore 82, said angled bore 82 being relative to bottom edge 80 of said bridge 44. Bore 82 is placed as near to bottom edge 880 of said bridge 44 as is possible and is best shown in FIG. 7. Bridge 44 may be made of styrofoam and have rounded edges to reduce any possible resistance.

Figure 8:
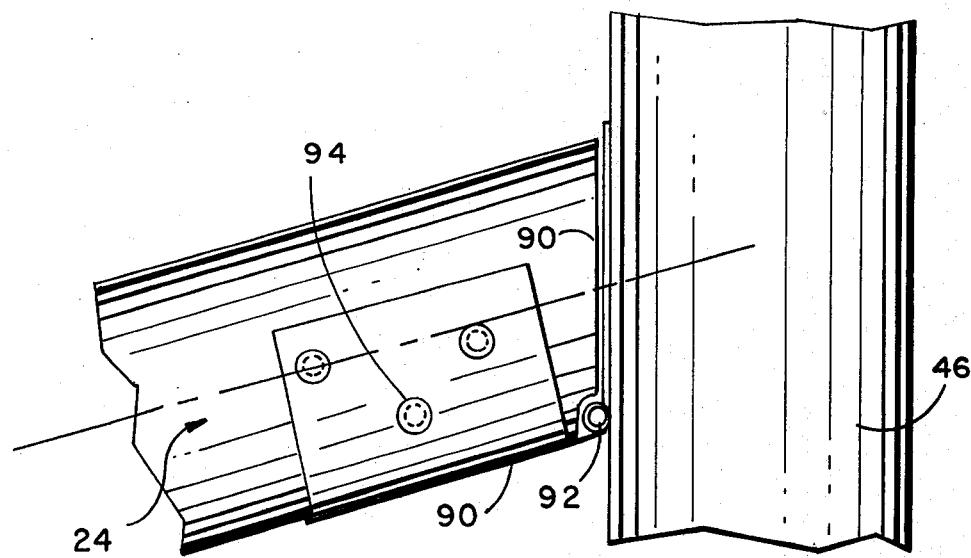
FIG. 8 is an enlarged view of the attachment of the transverse frame members to the formed wing tip of the upper wing of FIGS. 1 and 5.

FIG. 8 illustrates the attachment of formed wing tip 46 to transverse frame member 24. Hinge 90 is secured to wing tip 46 and transverse frame member 24. Pivot point 92 of hinge 90 is positioned to the front of hang glider 20. Hinge 90 is attached at the midpoint of wing tip 46. The portion of hinge 90 secured to transverse frame member 24 should be slightly curved to conform to the contour of said tubing member. Hinge 90 may be secured by screws 94 or other appropriate means.

Referring again to FIGS. 1 and 5, the shape of lower undercambered sail wing 54 is defined by the positioning of transverse frame member 24, which forms tubular leading edge 56 of lower sail wing 54. Sail fabric 60 is secured around transverse frame members 24 by a sewn seam. Trailing edge 72, consisting of fabric, nylon fabric tape, and stranded cable 39, is constructed in the same manner as leading and trailing edges 62, 64 of upper wing 52. Rear apex 49 of lower wing 54 is secured by means of stranded cable 39, within said trailing edge 72, to rear apex 48 of after keel member 26b as best illustrated in FIG. 5. Keel member 26b protrudes slightly beyond rear apex 49 of said lower wing 54. Tubular leading edge 56 meets forward apex 27 of after keel member 26b at collar 28.

Figure 10:
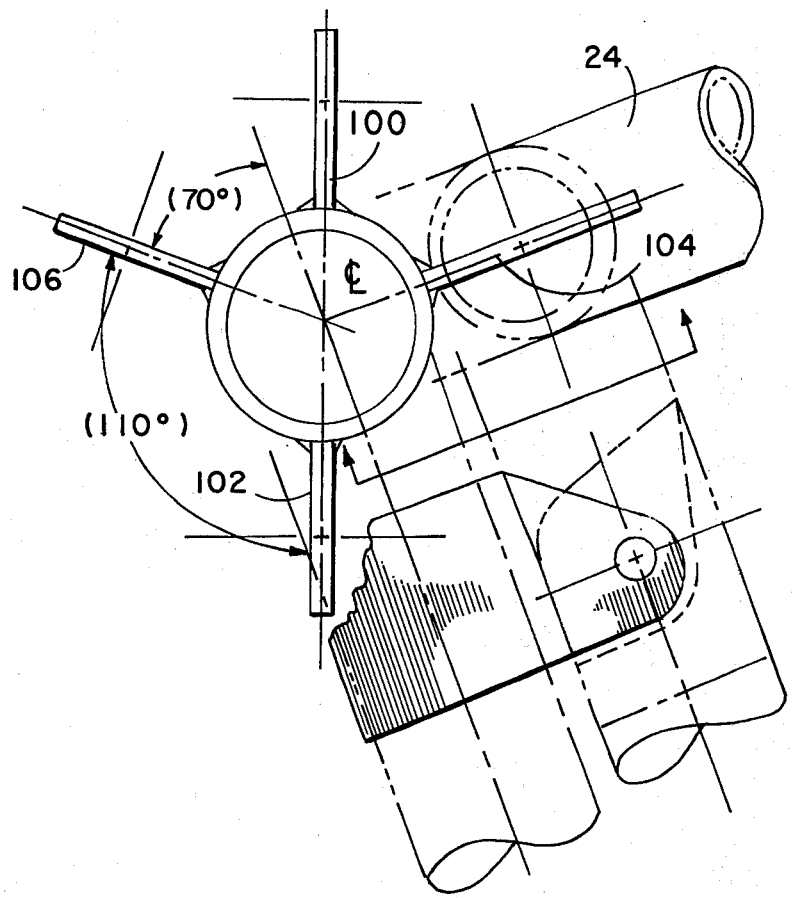
FIG. 10 is a view of the angular relations of the members of FIGS. 9 as seen in a front view.

Referring to FIG. 9, the connecting means, tubular collar 28, of the keel members 26a, 26b, transverse frame members 24, and control bar 32 is shown. After keel member 26b passes through and is surrounded by tubular collar 28. Four brackets (30) 100, 102, 104, 106 are secured to the outer perimeter of collar 28 by welding or other appropriate means and are spaced equidistant from each other. FIG. 10 illustrates the angular relations of the components. Side brackets 104, 106 which form hinges for transverse frame members 24, are angled upward to form an angle of 20° with respect to a horizontal plane. Brackets 100 and 102 are located respectively on the upper and lower surfaces of collar 28 being spaced 180° apart. Bracket 100 is angled slightly forward in relation to the positioning bracket 102.

Each bracket contains a bore 108, to provide means for support structure tubing 26a, 24 to be attached. Ends 110 of support structure tubing 26a, 24 are split longitudinally slightly so as to fit on brackets 100, 104, 106. Two wooden spacers 112, one side flat 114 and one side curved 116, are placed in support tubing ends 110. Bore 108 is placed through support tubing ends 110 and spacers 112. Flat portion 114 of spacers 112 rest on either side of brackets 100, 104, 106.

Forward keel member 26a attaches to upper bracket 100. Removable pin 102 secures the same. Transverse frame members 24 attach to brackets 104, 106 and are secured by bolts or pins 122. Control bar 32 is attached to lower bracket 102 and is secured by bolt or pin 124. Harness 126 may also be attached by appropriate means to collar 32 as illustrated in FIG. 1.

Referring to FIG. 11, triangularly shaped control bar 32 made of aluminum is illustrated. Bottom corners 40 are slightly rounded. Upper corner 130 of control bar 32 is formed by flattening control bar tubing 32 and placing each flat side 132 flush to rectangularly shaped bracket 102. Bolt 124 secures control bar 32 to bracket 102.

Figure 12:
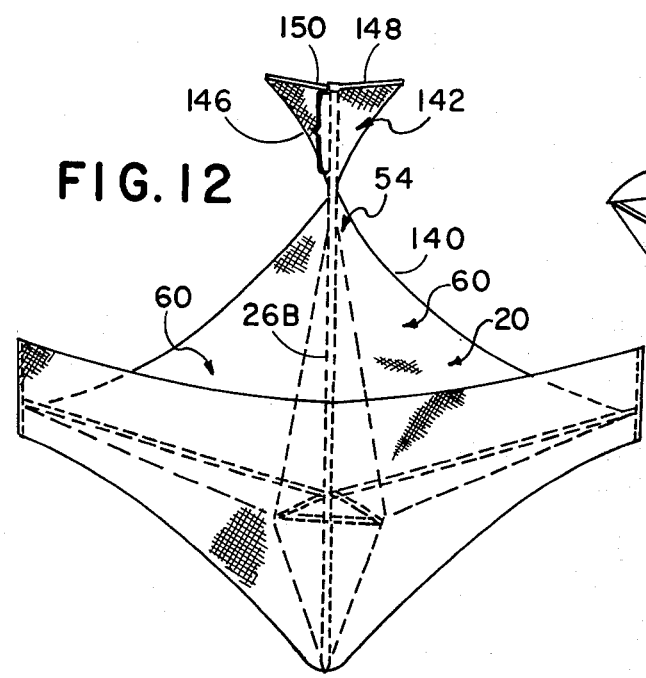
FIG. 12 is a top view of a modified form of the preferred embodiment of FIG. 1 showing the hang glider with an optional Y-tail assembly.
Figure 13:
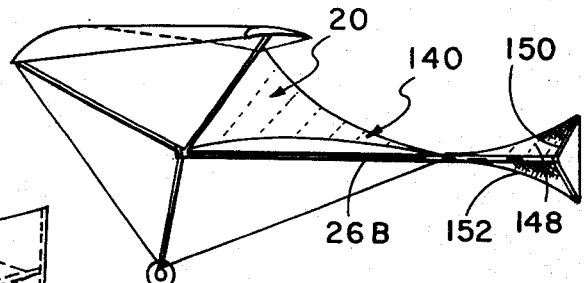
FIG. 13 is a side view of the hang glider optional tail modification of FIG. 12.
Figure 14:
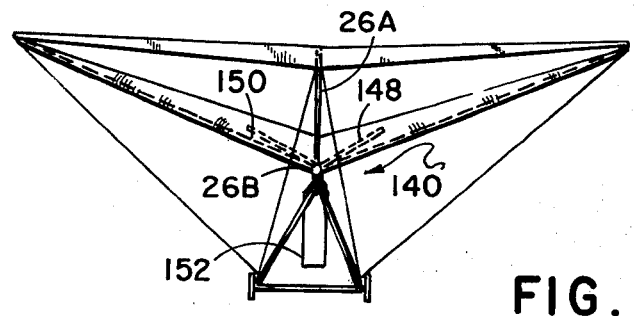
FIG. 14 is a front view of the optional tail modification of FIG. 12.

Referring to FIGS. 12, 13 and 14 modified hang-glider 140 with Y-tail is illustrated. Said modification is achieved by shortening the longitudinal length of sail 60 of lower wing 54. Y tail 142 is then secured around exposed section 146 of rear keel 26b. Upper Y-tail sections 148, 150 are positioned to form a diehedral angle similar to but greater than that of lower wing 54. Lower Y-tail section 152 is positioned directly below rear keel 26b and lies in a plane formed by keel member 26b, 26a, as illustrated in FIG. 14.

Figure 15:
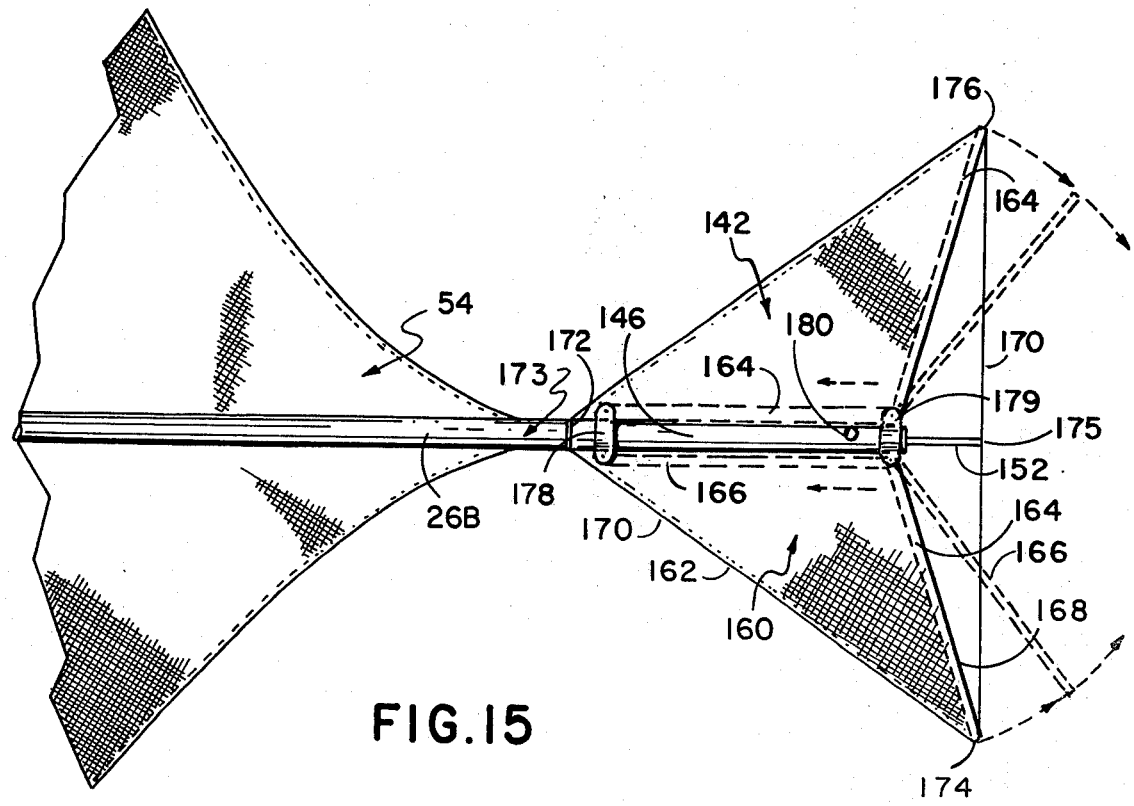
FIG. 15 is an enlarged top view of the optional tail modification of FIG. 12.

Referring to FIG. 15 triangular sail 160 is made of the same fabric as that in the preferred embodiment of hang glider 20. Each leading edge 162 is constructed in the same manner as leading edge 62 of upper wing 52. Trailing edge 164 is formed by securing sail fabric 160 around aluminum tubing 166 by means of sewn seam 168. Aluminum support tubing 166 is of a smaller diameter than that used in the rest of hang glider 20. A single stranded reinforcing cable 170, enclosed by leading edge 162, is secured to and extends from clamp 172 to outer tubular apex 174, to apex 175 to apex 176 and returns to clamp 172. Clamp 172 is positioned at point 173 where lower wing 54 is secured to keel 26b.

Slidable tubular collar 178, constructed similarly to tubular collar 32, with brackets 179 acting as hinges is fitted on keel 26b and is secured to keel 26b by means of removable pin 180. Support tubing 166 of trailing edge 164 is attached to tubular collar 178 by means of bracket hinges 179 in the same manner transverse frame members 24 were attached to collar 28. Cable 170 maintains tension thus maintaining the Y shape during flight.

Figure 16:
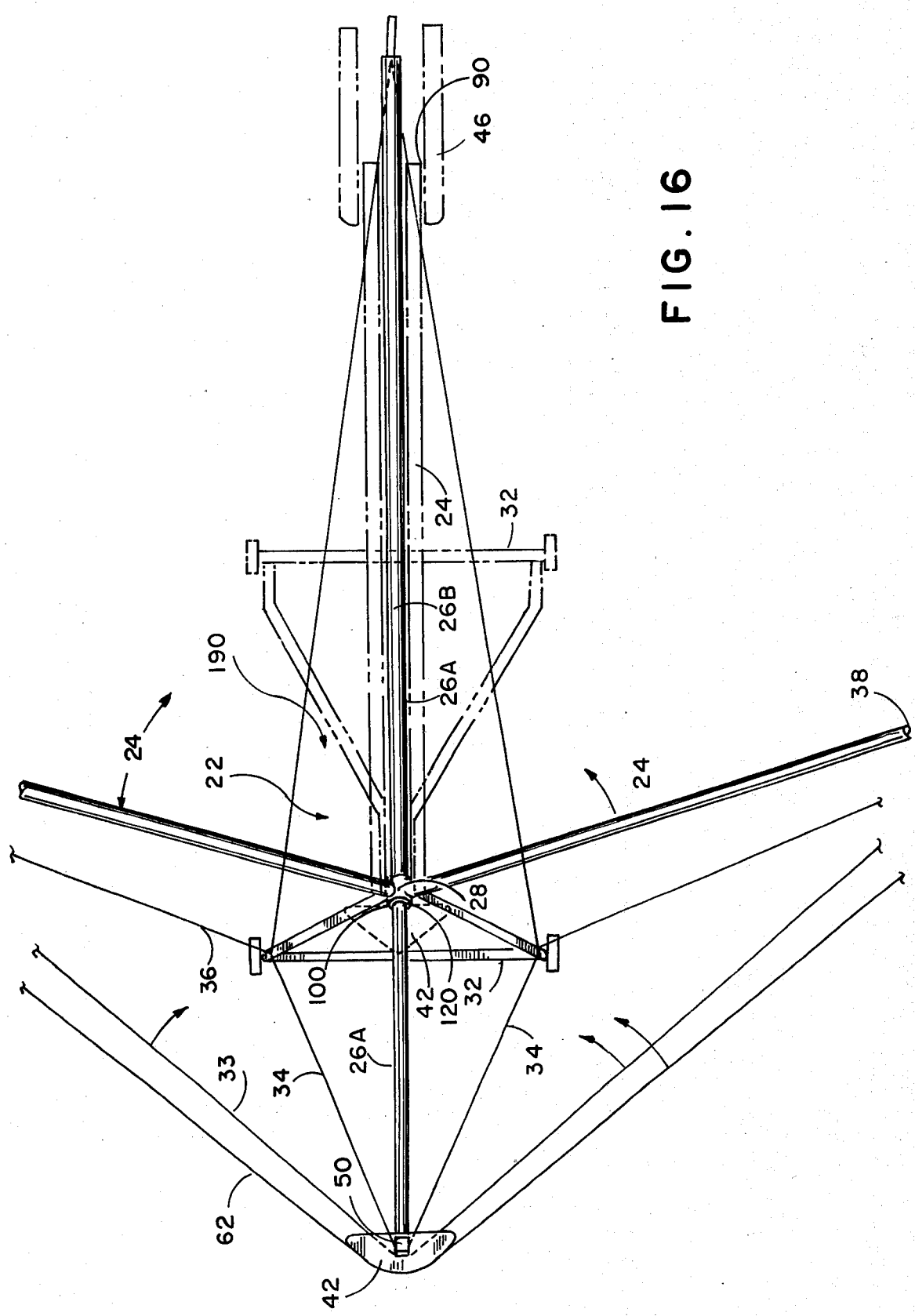
FIG. 16 is a top view of the tubular frame of the hang glider of FIGS. 1, 5 and 12, with the phantom lines showing the same in the closed or transport position.

Referring to FIGS. 16 and 10, hang glider frame 22 in its collapsed position 190 is illustrated by phantom lines. Turnbuckle 50 of stranded cable 34, near forward apex 42 of upper wing 52, is loosened. This in turn releases the tension of the cable system allowing removable pin 120 to be removed from forward keel 26a and bracket 100. Forward keel member 26a is folded under sail wing 60 of upper wing 52. Control bar 32 may then be folded rearwardly underneath rear keel member 26b. Transverse frame members 24, including upper wing 52 and lower wing 54, in their entirety, are then moved rewardly and positioned, along with forward keel 26a, at a position above and parallel to, rear keel member 26a. Wing tips 46, being on hinges 90 also lie parallel to keel 26b.

Referring also to FIG. 15 Y-tail section 142 may be folded by removing pin 180 and moving slidable collar 178 forward thus releasing cable system tension. Tubular trailing edges 148, 150, 152 being hinged 179, may be moved parallel to keel. By removing pin 180 and clamp 172 the entire Y-tail assembly 142 may be removed from keel 26b for storage.

To summarize the preferred embodiment particularly as illustrated in FIGS. 1 and 5, hang glider 20 comprises three functional units. The first is the basic support structure, all components of which are illustrated in FIG. 5, including frame 22, cables 33, 34, 36, 38, 39 and control bar 32. The second is upper wing 52 including bridge 44. The third is the lower wing 54.

While particular embodiments have been disclosed in detail, it is apparant that changes and modifications may be effected without departing from the spirit of the invention in its broader aspects, thus I do not desire to be limited to that precise form beyond the limitations which may be imposed by the following claims.

I claim:

1. A bi-winged collapsible hang glider assembly comprising:
   a variable camber upper swept wing made of sail fabric;
   an aerodynamically formed wing tip at each outer edge of said upper wing;
   frame members including a longitudinal forward tubular keel member supporting the leading apex of said upper wing;
   two transverse tubular support members having hinged connections to said aerodynamically formed wing tips of said upper wing and having pivotal connections to said forward keel member;
   a lower undercambered sail wing defined by said transverse tubular support members;
   a rearward longitudinal tubular after keel member having pivotal connections with said forward keel member and transverse support members and attached to the forward and rear apexes of said lower wing;
   a connecting tubular collar with perimeter hinge mounting means, surrounding said after keel member at the leading apex of said after keel member, said hinge mounting means providing said pivotal connections for said forward keel member and transverse support members;
   a control bar mounted to the underside of said tubular collar;
   a system reinforcing stranded cables attached to the lower corners of said control bar said cables extending to the leading apex of said forward keel member, including a turnbuckle, said cables extending to the rear apex of said after keel member, and said cables extending to said hinged connections of said transverse support member and said formed wing tips, said cables defining the leading and trailing edges of said upper wing and the trailing edge of said lower and said cables extending from said leading apex of said forward keel member to said formed wing tips.

2. A bi-winged hang glider as defined in claim 1 wherein said upper swept wing supported by said forward keel member and said transverse support members further includes
   a sail made of said sail fabric;
   the leading and trailing edges of said upper wing being a non-rigid trailing edge formed by a combination of said fabric and nylon fabric tape securely sewn around said reinforcing stranded cables;
   a semi-rigid batten, securely sewn in said fabric extending longitudinally from the leading apex of said leading edge to the midpoint of said trailing edge;
   said aerodynamically formed wing tips secured within said fabric and
   a formed bridge spacing said fabric of the leading apex of said upper wing from the leading apex of said forward supporting keel member.

3. A bi-winged hang glider defined in claim 1 wherein said lower and undercambered sail wing further includes
   a sail made of fabric supported by said transverse tubular members
   a tubular leading edge defined by said fabric being securely sewn around said tubular transverse members secured to said upper wing;
   and said lower wing trailing edge being a non-rigid trailing edge formed by a combination of said fabric and nylon fabric tape securely sewn around said reinforcing stranded cable.

4. A hang glider as defined in claim 1 wherein said frame members including said forward keel member, said after keel member, and said transverse support members are pivotally connected and integrated further including:
   said tubular collar with said perimeter hinge mounting means comprising brackets surrounding said keel member;

said transverse members hinged to said brackets on both sides of said collar and forming an angle of 70° on both sides of a plane formed by said keel members;

said forward keel member hinged on the upper surface of said collar and secured by a removable pin to said brackets; and said control bar hinged to said brackets on the underside of said collar.

5. A hang glider as defined in claim 1 incorporating on said after keel member a Y-tail assembly which further includes:

three sails made of fabric;

non-rigid leading edges formed by a combination of said fabric and nylon tape securely sewn around a reinforcing stranded cable;

tubular trailing edges definded by said fabric securely sewn around a tubular frame;

a slidable tubular collar surrounding said after keel member and secured to said after keel member by a removable pin, three brackets surrounding the perimeter of said slidable tubular collar hinging said inner ends of said tubular trailing edges to said slidable tubular collar;

a clamp at the leading apex of said trail assembly secured around said after keel member at the trailing apex of said lower wing; and an integrated reinforcing stranded cable system, extending from said clamp and connecting in combination the outer apexes of said tubular trailing edges.

6. A hang glider as defined in claim 1 wherein said assembly collapses into a folded position by disconnecting said turnbuckle located on said stranded cable under said leading apex of said upper wing, by removing a pin from said forward keel member and said tubular collar;

by folding rearward said control bar;

by moving said forward keel member rearwardly under said upper wing; and by moving said transverse members to a parallel position with said after keel member at the same time said forward keel member is placed parallel to said after keel member.

7. A hang glider as defined in claim 5 wherein said tail assembly collapses into a folded position, by removing said removable pin from said slidable tubular collar and sliding said slidable tubular collar forward; and by moving said hinged tubular trailing edges parallel to said after keel member.

8. The hang glider as defined in claim 1 wherein said forward keel and said after keel members forming sectional keel members and an obtuse angle at the pivotal connection of said keel members, said angle being approximately 70°.

9. The hang glider as defined in claim 1 wherein the frame members are constructed of aluminum.

10. The hang glider as defined in claim 5 wherein said forward keel and said after keel members forming sectional keel members and an obtuse angle at the pivotal connection of said keel members, said angle being approximately 70°.

11. The hang glider as defined in claim 5 wherein the frame members are constructed of aluminum.

* * * * *